US008306017B2

(12) United States Patent
Desorbay et al.

(10) Patent No.: US 8,306,017 B2
(45) Date of Patent: Nov. 6, 2012

(54) UMA CS/PS SPLIT ARCHITECTURE AND INTERFACE

(75) Inventors: Eric Desorbay, Campbon (FR); Gerard Pouplin, Nantes (FR); Bruno Landais, Pleumeur-Boudu (FR); Didier Feron, La Chapelle sur Erdre (FR)

(73) Assignee: Alcatel Lucent, Paris (FR)

( * ) Notice: Subject to any disclaimer, the term of this patent is extended or adjusted under 35 U.S.C. 154(b) by 1241 days.

(21) Appl. No.: 11/914,188

(22) PCT Filed: Mar. 22, 2006

(86) PCT No.: PCT/EP2006/004035
§ 371 (c)(1),
(2), (4) Date: Nov. 12, 2007

(87) PCT Pub. No.: WO2006/119878
PCT Pub. Date: Nov. 16, 2006

(65) Prior Publication Data
US 2008/0198841 A1    Aug. 21, 2008

Related U.S. Application Data

(60) Provisional application No. 60/680,797, filed on May 13, 2005, provisional application No. 60/681,451, filed on May 16, 2005.

(51) Int. Cl.
*H04L 12/66* (2006.01)
(52) U.S. Cl. ...................................... 370/352
(58) Field of Classification Search .......... 370/328, 370/331, 338, 352; 455/410, 435, 445, 456
See application file for complete search history.

(56) References Cited

U.S. PATENT DOCUMENTS

| | | | |
|---|---|---|---|
| 7,454,207 B2 * | 11/2008 | Gallagher et al. | ......... 455/435.1 |
| 7,606,190 B2 * | 10/2009 | Markovic et al. | ............. 370/328 |
| 2002/0065086 A1 | 5/2002 | Vanttinen | |
| 2003/0169768 A1 | 9/2003 | Bienn | |
| 2006/0209799 A1 * | 9/2006 | Gallagher et al. | ............ 370/352 |

OTHER PUBLICATIONS

"UMA Architecture (Stage 2) R1.0.4 (May 2, 2005); Unlicensed Mobile Access (UMA); Architecture (Stage 2)", Technical Specification, XP002394548.
"UMA Protocols (Stage 3) R1.0.4 (May 2, 2005); Unlicensed Mobile Access (UMA); Protocols (Stage 3)", Technical Specification, XP002394549.

* cited by examiner

*Primary Examiner* — Kevin C Harper
*Assistant Examiner* — Henry Baron
(74) *Attorney, Agent, or Firm* — Harness, Dickey & Pierce

(57) ABSTRACT

In at least one embodiment, an Unlicensed Mobile Access (UMA) network controller for a UMA mobile network is provided. The UMA network controller includes a circuit switched core network with at least one mobile switching center and a media gateway, and a packet switched core network with at least one serving GPRS serving node. The UMA network controller forwards messages relative to a control plan for both the circuit switched core network and the packet switched core network between mobile stations and at least one circuit switched part. The UMA network controller further forwards messages relative to a user plan for the circuit switched core network between mobile stations and the media gateway. The UMA network controller further forwards messages relative to a user plan for the packet switched core network between mobile stations and at least one packet switched part.

16 Claims, 3 Drawing Sheets

UMA CS/PS SPLIT ARCHITECTURE AND INTERFACE

CROSS-REFERENCE TO RELATED APPLICATIONS

This application is a national stage entry of PCT/EP2006/004035 filed Mar. 22, 2006, based on U.S. Provisional Patent Applications Nos. 60/680,797 filed May 13, 2005, and 60/681,451 filed May 16, 2005, the disclosures of which are hereby incorporated by reference thereto in their entirety, and the priorities of which are hereby claimed under 35 U.S.C. §119.

BACKGROUND OF THE INVENTION

1. Field of the Invention

The present invention relates to the domain of mobile (or cellular) communication networks, and more precisely to mobile communication networks of the UMA (Unlicensed Mobile Access) type, defined by the technical specifications of the 3GPP TS 43.318 v6.4.0, "Generic access to the A/Gb interface-stage 2" (release 6), and TS 44.318 v6.3.0-"Generic Access (GA) to the A/Gb interface, Mobile GA interface layer 3 specification" (Release 6).

2. Description of the Art

As it is known by the man skilled in the art, an UMA network must comprises UMA access node called UNC (UMA Network Controller) to interface with mobile switching center(s) (MSC) belonging to its circuit switched (CS) core network and to serving GPRS support node(s) (SGSN) belonging to its packet switched (PS) core network.

In order a mobile station could exchange data with the UMA network, a permanent TCP (Transmission Control Protocol) connection must be established with an UNC, through which the CS and PS protocols are supported, after an authorization phase. Since a TCP connection is natively a transport connection oriented protocol, an UNC is a standalone machine supporting altogether CS and PS services, according to the 3GPP UMA standard.

From a network topology perspective, an UNC is comparable to a GERAN BSC (GSM EDGE Radio Access Network Base Station Controller) as it offers access to a core network by means of A and Gb interfaces respectively for CS and PS core network parts.

A BSC of a GERAN necessitates solid CPU capacities to handle radio resource management algorithms and plays a role of concentration node in a TDM transmission network organized with base stations (BTSs) in a star configuration. Therefore altogether for CPU reasons and transmission network organization, the BSCs are very justified as dedicated access network nodes.

An UMA access network having a number of specificities compared to a GERAN network, an UNC i) must have much less CPU requirements as it does not handle radio resource management algorithms with complex radio optimization features, ii) is merely a protocol gateway function for the CS core network part and a forwarding machine for the PS core network part, and iii) supports WiFi access point through a native IP network and therefore is not subject to any topology constraints linked to TDM transmission network.

So, even though an UNC stands as a BSC in a GERAN model, it has little to do with a radio communication equipment and is more a core network type node as it is a kind of access server combined with a protocol relay and a traffic forwarder.

Moreover, no manufacturer offers a combined MSC/SGSN product.

SUMMARY OF THE INVENTION

So, the object of this invention to improve the situation by splitting an UNC into UNC-CS and UNC-PS parts linked through a specific interface having features such as i) supporting the UNC splitting which has not been provide for by the 3GPP UMA standard, ii) allowing an efficient communication between UNC-CS and UNC-PS parts, iii) supporting a high availability operation, iv) overcoming a number of difficulties linked to particular UMA network topology constraints (e.g. when operating with a limited number of UMA cells), v) supporting load sharing, vi) supporting optimized operator radio resource usage, vii) providing a set of additional control features allowing the UNC-CS part to have control on the GPRS resource usage, and more precisely push to UNC-PS part of resource description and allocation policy (e.g. globally, per routing area (RA)).

For this purpose, it provides an UMA network controller (UNC) for an UMA mobile communication network comprising a circuit switched core network with at least one mobile switching center (MSC) and a media gateway (MGW), a packet switched core network with at least one serving GPRS serving node (SGSN).

This UMA network controller (UNC) is characterized in that it comprises a security gateway (SGW), a packet switched part (UNC-PS) and a circuit switched part (UNC-CS).

The SGW is coupled to an MGW, to at least one packet switched part (UNC-PS) and to at least one circuit switched part (UNC-CS), and is arranged i) to ensure security procedures between mobile stations and the UMA world, ii) to forward messages relative to the control plan for both circuit switched and packet switched core networks between mobile stations and at least one circuit switched part (UNC-CS), iii) to forward messages relative to the user plan for the circuit switched core network between mobile stations and the MGW, and iv) to forward messages relative to the user plan for the packet switched core network between mobile stations and at least one packet switched part (UNC-PS).

The packet switched part (UNC-PS) is intercalated between the SGSN(s) and the SGW, and arranged for forwarding user data between this SGSN and mobile stations through the SGW, and for handling the control plan for the packet switched core network through packet switched call messages over TCP.

The circuit switched part (UNC-CS) is intercalated between the SGW and an MSC, and arranged for handling the control plan for the circuit switched core network and discovery and registration procedures of mobile stations, for forwarding packet switched call messages over TCP between a packet switched part and these mobile stations through the SGW, and for relaying circuit switched call messages between this MSC and the mobile stations through the SGW.

The UMA network controller according to the invention may include additional characteristics considered separately or combined, and notably:

its packet switched part and circuit switched part may be arranged to exchange messages through at least one TCP path, or another transport path, such as an UDP path for instance (one means here by "transport path" a path associated to a transport (or transmission) protocol);

its packet switched part may comprise a pilot station implementing an operating and maintenance (OAM) function and chosen centralized functions, and at least one logical service station arranged for handling the control plan and the user plan of the GPRS traffic;

its circuit switched part may comprise at least one logical unit UNC-CS arranged i) to establish a TCP connection (or another type of transport connection such as an UDP one, for instance (one means here by "transport connection" a connection associated to a transport (or transmission) protocol)) with at least one logical service station of at least one packet switched part, ii) to handle the control plan for the circuit switched core network and discovery and registration procedures of the mobile stations, iii) to forward packet switched call messages over TCP between each of the service stations and the mobile stations through the security gateway, and to relay circuit switched call messages between the mobile switching center and the mobile stations through the security gateway;

each service station may be a functional entity supporting one TCP connection (or another type of transport connection such as an UDP one, for instance) per logical unit UNC-CS, and one NSE (network service entity) per serving GPRS serving node;

each logical unit UNC-CS may be arranged for selecting a TCP path (or another type of transport path such as an UDP one, for instance) among the ones that serves a chosen routing area identity associated to a serving GPRS serving node. In this case, the service station which is connected to this chosen TCP path (or UDP path, for instance) is arranged for selecting a network service entity among the ones that can be selected for the chosen routing area identity;

each logical unit UNC-CS may be arranged, when it needs to establish a TCP connection (or another type of transport connection such as an UDP one, for instance), i) to require to the pilot station of the packet switched part, the identity of each of its active service stations and the IP address and the TCP port (or another type of transport port such as an UDP one, for instance (one means here by "transport port" a port associated to a transport (or transmission) protocol)) to use in order to establish a TCP path (or UDP path, for instance) with each of these active service stations, then ii) to establish effective TCP connections (or UDP connections, for instance) with these active service station, by means of the respective received IP addresses and TCP ports (or UDP ports, for instance), and then iii) to send its identity, within the established TCP connections (or UDP connections, for instance), to the active service stations in order they send it at least their respective identities and eventual lists of routing area identities that they can respectively serve;

each active service station may be arranged to accept the TCP connection (or UDP connection, for instance) even if all its NSEs (network service entities) are not operational;

each logical unit UNC-CS may be arranged to try again periodically to establish the TCP connection (or UDP connection, for instance) when it fails;

each logical unit UNC-CS may be arranged to monitor the availability of the TCP connections (or UDP connections, for instance) by sending periodically a dedicated message to the pilot and service stations of the concerned packet switched part;

each logical unit UNC-CS may be arranged, when it receives a message of an URR type from a mobile station, to choose a TCP connection (or UDP connection, for instance) adapted to handle messages of the URR and URLC types received from this mobile station, then to forward the received URR message to the service station connected to this chosen TCP connection (or UDP connection, for instance), within a message of an UPPS type;

each service station may be arranged, when it receives an UPPS message containing an URR message from a mobile station, to allocate a NSE+BVCI (Network Service Entity+BSS Virtual Connection Identifier) to a Cell Identifier contained into this received UPPS message;

each logical unit UNC-CS may be arranged, when it receives a message of an URR type from a mobile station and when it manages more than one routing area identity, either to select one of these routing area identities by means of at least one chosen rule, or to select the routing area identity transmitted by the mobile station, and then to select the service station corresponding to the selected routing area identity;

each logical unit UNC-CS may be arranged, when it receives a message of an URLC type from a mobile station, to forward this received URLC message to the concerned service station, via a selected TCP connection (or UDP connection, for instance), within a message of an UPPS type. In this case, the service station may be arranged, when required and when it receives the UPPS message comprising the URLC message, to create a context associated to the mobile station and to forward the data contained into the URLC message to a serving GPRS serving node through a network service entity associated to the routing area identity which is associated to this serving GPRS serving node;

its circuit switched part may be installed into a circuit switched call server which also comprises the mobile switching center (MSC).

BRIEF DESCRIPTION OF THE DRAWINGS

Other features and advantages of the invention will become apparent on examining the detailed specifications hereafter and the appended drawings, wherein.

DETAILED DESCRIPTION OF THE INVENTION

In the following description it will be considered that the mobile network is of the GPRS type and comprises an UMA core network.

Figure 1:
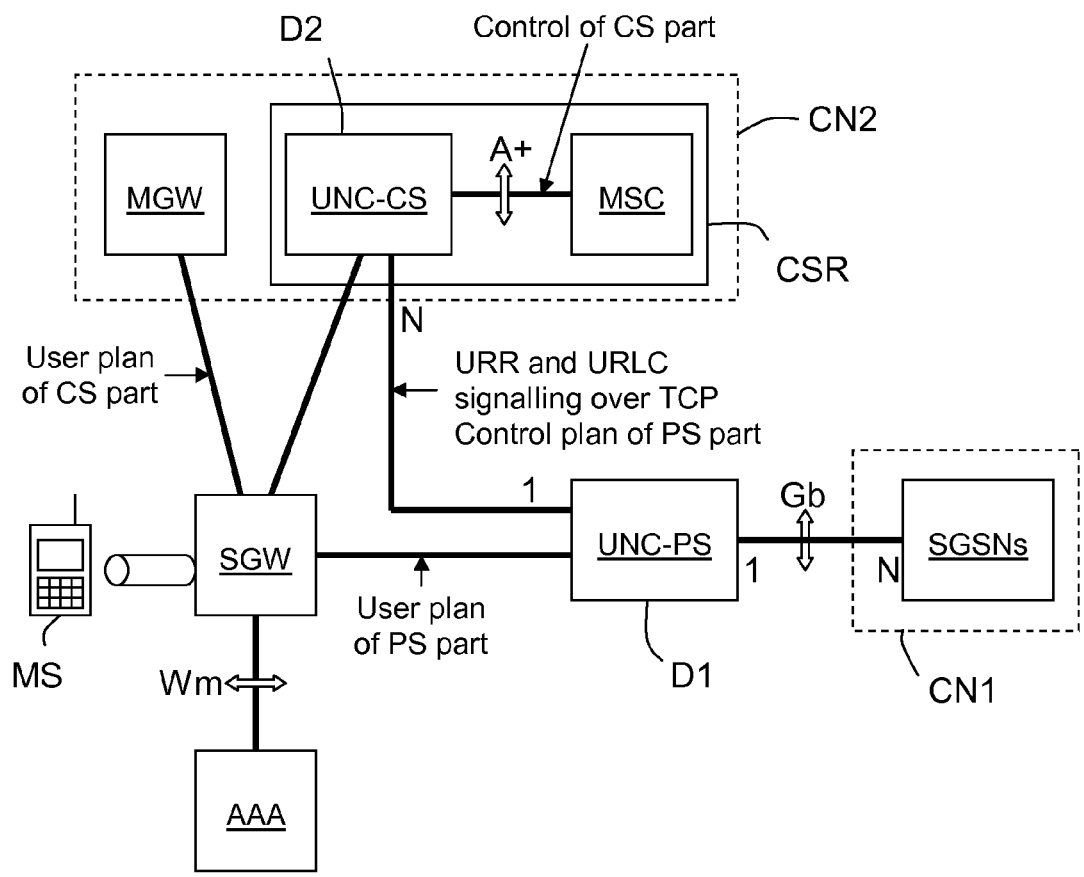
FIG. 1 schematically illustrates an example of a part of an UMA mobile network comprising an UMA network controller according to the invention, FIG. 2 schematically illustrates an example of TCP paths established between different mobile stations and logical unit UNC-CSs and between these logical unit UNC-CSs and service stations (UNC-PS), and of NSEs established between these service stations (UNC-PS) and serving GPRS serving nodes (SGSNs), FIG. 3 schematically illustrates the setting of TCP paths and the transmission of the logical UNC-PS characteristics between a logical unit UNC-CS and service stations (UNC-PS), and FIG. 4 schematically illustrates the process of an URR-REGISTER-REQUEST message transmitted by a mobile station (MS) to a logical unit UNC-CS (LUi) in case where this message contains a new RAI which is not served by the same TCP connection than an older one.

As it is schematically illustrated in FIG. 1, an UMA mobile communication network comprises notably a packet switched (PS) core network CN1, a circuit switched (CS) core network CN2 and at least one UMA network controller comprising a security gateway SGW, a packet switched part D1 and a circuit switched part D2.

The packet switched core network CN1 comprises notably at least one serving GPRS serving node SGSN coupled to at least one packet switched part D1, hereafter named physical UNC-PS. The circuit switched core network CN2 comprises notably a media gateway MGW and a mobile switching center MSC coupled to at least one circuit switched part D2, hereafter named physical UNC-CS.

The Security Gateway SGW is coupled to the media gateway MGW, to at least one physical UNC-PS D1, and to at least one physical UNC-CS D2. It is arranged to implement four main and classical functionalities.

Its first functionality consists in ensuring the security procedures (authentication, encryption and interaction with a server AAA dedicated to authentication, authorization and accounting) between the mobile stations MS and the UMA world.

Its second functionality consists in forwarding the URR (UMA Radio Resources) and URLC (UMA Radio Link Control) messages over TCP connection between the mobile stations MS and at least one physical UNC-CS D2. In other words, it forwards the messages relative to the control plan for both circuit switched (CS) and packet switched (PS) core networks.

Its third functionality consists in forwarding the circuit switched data (such as voice over IP) between the mobile stations MS and the media gateway MGW. In other words, it forwards the messages relative to the user plan for the circuit switched core network CN2.

Its fourth functionality consists in forwarding the URLC messages over UDP between the mobile stations MS and at least one physical UNC-PS. In other words, it forwards the messages relative to the user plan for the packet switched core network CN1.

Each physical UNC-CS D2 is both connected to the mobile switching center MSC, to the security gateway SGW, and to at least one physical UNC-PS D1. It is arranged to implement third main functionalities.

Its first functionality consists in handling the discovery procedure (redirection to the serving UNC-CS and the registration procedure of the mobile stations MS in the serving UNC-CS.

Its second functionality consists in handling the control plan of the circuit switched calls. In other words, it interfaces with the mobile switching center MSC in order to relay the circuit switched call messages between the mobile switching center MSC and the mobile stations MS through the security gateway SGW.

Its third functionality consists in forwarding the URLC messages over transport connexions between at least one physical UNC-PS D1 and the mobile stations MS through the security gateway SGW. In other words, it forwards the messages relative to the control plan for the packet switched core network CN1.

In the following description it will be considered everywhere that TCP is the transport (or transmission) protocol used between UNC-CS and UNC-PS parts of one or more UMA network controller(s) according to the invention. So a transport connexion is a TCP connection, a transport path is a TCP path and a transport port is a TCP port. But, the invention is not limited to this type of transport (or transmission) protocol. It applies to other types of transport (or transmission) protocol, and notably to UDP.

Each physical UNC-CS D2 comprises one or more logical units LUi (each defining a logical UNC-CS).

As illustrated in FIG. 1, at least one physical UNC-CS may be co-localized with a mobile switching center MSC into a call server CSR. In a variant, at least one physical UNC-CS D2 may be co-localized with a GERAN BSC.

Each physical UNC-PS D1 is both connected to the security gateway SGW, to at least one physical UNC-CS D2 and to at least one serving GPRS serving node SGSN. It is arranged to implement two main functionalities.

Its first functionality consists in handling the control plan for the packet switched (PS) core network, through packet switched call messages over TCP connexions, in order to allow interworking between URLC and BSSGP (Base Station System GPRS Protocol).

Its second functionality consists in handling the user plan for the packet switched core network CN1. In other words, it forwards the user data between one or more serving GPRS serving node(s) SGSN and the mobile stations MS through the security gateway SGW (i.e. between URLC and BSSGP).

Each physical UNC-PS D1 comprises a pilot station PSN and one or more service stations SSj (each defining a logical UNC-PS). According to the invention, a physical UNC-PS D1 is physically different from a physical UNC-CS D2, but they may be co-localized in a same site.

At least one physical UNC-PS D1 may be co-localized with a serving GPRS serving node(s) SGSN into a packet switched core network node. In a variant, at least one physical UNC-PS D1 may be part of a GPRS gateway. In another variant, at least one physical UNC-PS D1 may be co-localized with a GERAN PCU (PC Unit).

In order to control the use of the GPRS resources, a physical UNC-CS D2 may send the expected system capacity (e.g. Routing Area (RA) and/or cell capacity), in terms of overall throughput and number of transport channels, to a physical UNC-PS D1, at least before the first mobile station MS registration in a cell. As an implementation option it can be signaled either in dedicated supervision messages or appended to the mobile station MS registration message indicating the cell the mobile station MS is located in. Furthermore, the physical UNC-CS D2 can dynamically update the cell capacity in case of change, for example to adapt the CS/PS resource balance depending on UNC-CS criteria (time of day, quality of the CS calls etc).

Moreover, a physical UNC-CS D2 can control the quality of service (QoS) that a physical UNC-PS D1 allocates to a mobile station MS. This can be done either globally, i.e. per UNC-CS/UNC-PS interface, per Routing Area or per cell, by means of supervision messages. Alternatively this can be done per mobile station MS, for example based on the physical UNC-CS D2 knowledge of UMA subscription data. Based on the allocation policy received, a physical UNC-PS D1 can negotiate a packet flow context received from a SGSN and put in place a traffic conformance filter.

Furthermore, for a better control of the system resources, especially in overload situation, the UNC-CS/UNC-PS control plan flows can be separated over several TCP connections.

When there is only one UMAN (UMA Network) routing area code (UMAN RAC) whatever the location area identity (LAI—defined in the technical specification TS 24.008 of the 3GPP), the routing area code (RAC) is configured within the physical UNC-CS D2. The selection of a TCP connection by a physical UNC-CS D2 does not depend on the routing area identity (RAI) and there is one network service entity (NSE) per logical UNC-PS SSj. It is recalled that the RAI is the concatenation of the LAI and the RAC, while the cell global identity (CGI) is the concatenation of the LAI and the cell identity (CI). Therefore, only one physical UNC-PS can be connected to one serving GPRS serving node SGSN, otherwise several SGSNs could see the same RAI. The selection of a TCP connection by a physical UNC-CS D2 does not depend on load criteria associated to each TCP connection (random choice of the TCP connection).

When there is more than one UMAN RAC per LAI (in other words the RAC can be configured in the UMA database or depending on a configuration data, the RAI can be the GSM one), the RAI may be introduced as routing criteria between a physical UNC-CS D2 and a physical UNC-PS D1. The selection of a TCP connection by a physical UNC-CS D2 and the selection of a NSE by a physical UNC-PS D1 depend on the RAI. Then, one serving GPRS serving node SGSN can be selected for one RAI and another serving GPRS serving node SGSN can be selected for another RAI. Therefore, a physical UNC-PS D1 can be connected to one or more serving GPRS serving node SGSNk. The selection of a TCP connection by a physical UNC-CS D2 depends on load criteria associated to each TCP connection.

All the messages exchanged between a physical UNC-CS D2 and a physical UNC-PS D1 use a TCP path which will be described hereafter.

Figure 2:
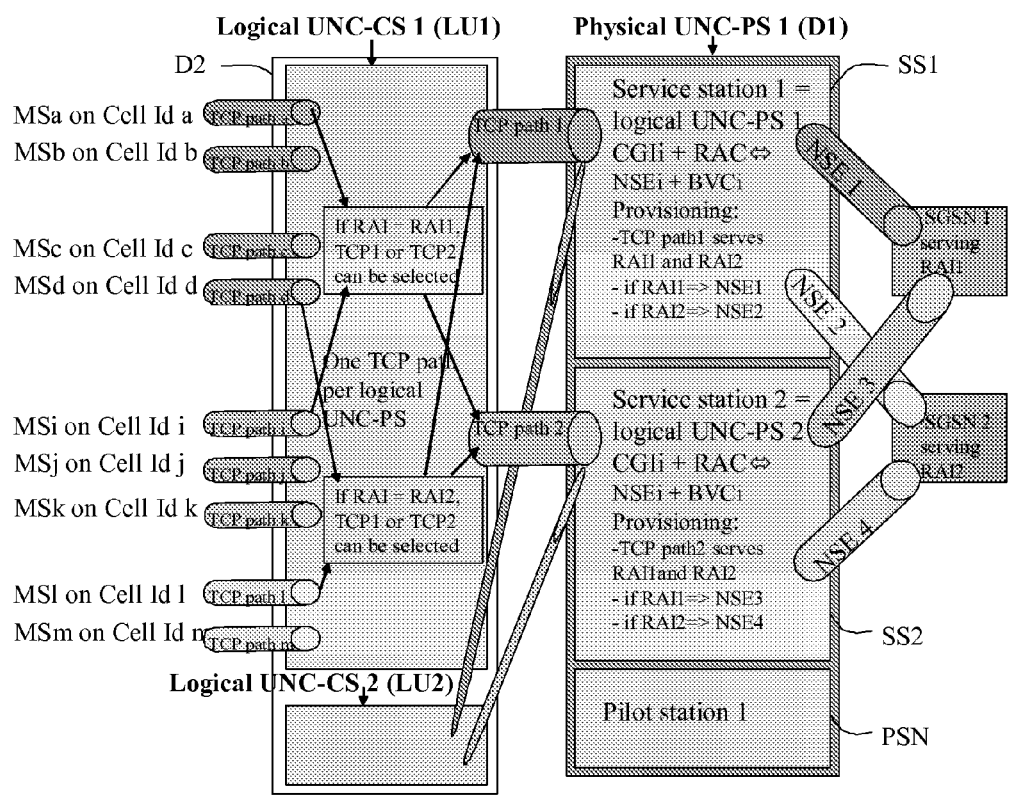

Within the UMA network, the physical UNC-CS D2 and the physical UNC-PS D1 may be configured as illustrated in FIG. 2. In this FIG. 2 only two logical units UNC-CS LU1 and LU2 of only one physical UNC-CS D2 and only two service stations SS1 and SS2 of only one physical UNC-PS D1 are illustrated to avoid to much complexity. It is recalled that the number of logical units UNC-CS LUi only needs to be at least equal to 1 (i>0), and the number of service stations SSj only needs to be at least equal to 1 (j>0).

A logical unit (or entity) UNC-CS LUi (here i=1 and 2) is a logical UNC-CS that is seen as a whole physical UNC-CS D2 from the physical UNC-PS D1 point of view.

As mentioned before, a physical UNC-PS D1 contains several service stations SSj (here j=1 and 2) for the control plan and the user plan of the GPRS traffic and one pilot station PSN for OAM (Operating And Maintenance) and chosen centralized functions.

Each service station SSj defines a logical UNC-PS which is a functional entity that supports one TCP connection (TCP path i) per logical unit UNC-CS LUi on the UNC-CS side, and one or more NSE (NSE k) on the SGSN side.

In FIG. 2 the first logical unit LU1 is connected to the first service station SS1 through a first TCP connection (TCP path 1) and to the second service station SS2 through a second TCP connection (TCP path 2). The first service station SS1 is connected to first SGSN1 and second SGSN2 serving GPRS serving nodes respectively through first NSE1 and second NSE2 network service entities. The second service station SS2 is connected to the first SGSN1 and second SGSN2 serving GPRS serving nodes respectively through third NSE3 and fourth NSE4 network service entities. The first SGSN1 and second SGSN2 serving GPRS serving nodes are respectively associated to first RAI1 and second RAI2 routing area identities.

A logical unit UNC-CS LUi selects a TCP path (TCP path j) among the ones (TCP path1 and TCP path 2) that serves a chosen RAI (RAIk) associated to a serving GPRS serving node SGSNk and the service station SSj which is connected to this TCP path j selects a network service entity NSEk among the ones that can be selected for this RAI RAIk.

When there is only one UMAN routing area code, the TCP path selection by a logical unit UNC-CS LUi and the NSE selection by the service station SSj do not depend on the RAI.

Figure 3:
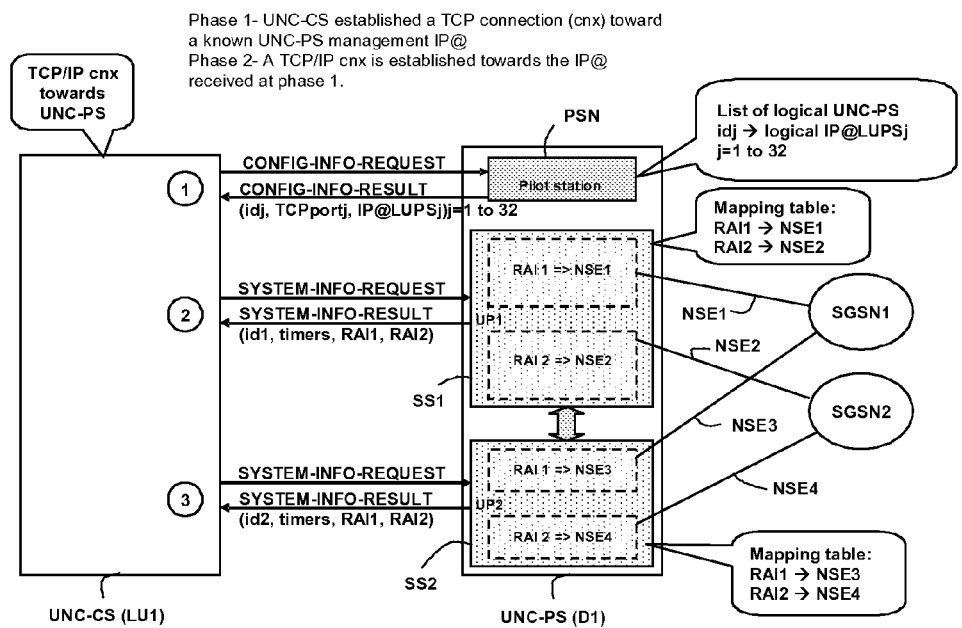

The setting of a TCP path is schematically illustrated in FIG. 3. It consists in two main phases.

In the first phase the IP addresses of the active service stations SSj are transmitted to the logical unit UNC-CS LUi which requires establishment of a TCP connection. More precisely, when a logical unit UNC-CS LUi is running, it tries to establish a specific TCP path with the pilot station PSN of a physical UNC-PS D1. For instance the IP address and the TCP port of this physical UNC-PS D1 is memorized (configured) into the logical unit UNC-CS LUi (for instance the TCP port is 41000).

Then, the logical unit UNC-CS LUi sends a CONFIG_INFO_REQUEST message to the physical UNC-PS D1. When the pilot station PSN of the physical UNC-PS D1 receives this message, it answers to the logical unit UNC-CS LUi with a CONFIG_INFO_RESULT message. This message contains three characteristics associated to each active service station SSj of the physical UNC-PS D1: the identity of each active service station SSj (for instance one IP address which is a virtual IP address) and the IP address and TCP port that must be used by the logical unit UNC-CS LUi to establish one TCP connection (TCP path j) with the active service station SSj.

Here "active service station SSj" means hardware present and administrative state equal to "unlock". An active state does not depend on the configuration and state of the network service entity NSEk associated to an active service station SSj.

For instance, if the concerned logical unit UNC-CS LUi does not receive the CONFIG_INFO_RESULT message before an internal timer expiry, it should resend the CONFIG_INFO_REQUEST message. If the procedure fails n times, it reopens the TCP connection from the beginning.

The TCP connection is kept permanently after reception of the CONFIG_INFO_RESULT message by the concerned logical unit UNC-CS LUi.

Preferably, the logical unit UNC-CS LUi monitors the availability of the TCP connection by sending periodically a KEEP-ALIVE message to the pilot station PSN of the physical UNC-PS D1. If the logical unit UNC-CS LUi does not receive a response to the KEEP-ALIVE message before an internal timer expiry, it should resend this KEEP-ALIVE message. If the procedure fails n times, it reopens the TCP connection. If the TCP connection fails, the logical unit UNC-CS LUi is responsible to reestablish it.

In the second phase the logical unit UNC-CS LUi tries to establish effective TCP connections with the active service station SSj, using their received IP addresses and TCP ports. More precisely, when the logical unit UNC-CS LUi receives the message CONFIG_INFO_RESULT, it first tries to establish a TCP path with the active service stations SSj, using each of the received IP addresses and TCP ports.

Each active service station SSj accepts the TCP connection even if all its NSEs are not operational. A NSE is operational when at least one network service virtual connection (NSVC) is operational.

As long as the TCP connection establishment fails, the logical unit UNC-CS LUi tries again periodically.

When a TCP connection is established, the logical unit UNC-CS LUi sends a SYSTEM_INFO_REQUEST message with its identity, within this TCP connection, to the concerned active service station SSj.

Then, the concerned active service station SSj answers to the SYSTEM_INFO_REQUEST message with a SYSTEM_INFO_RESULT message containing two or three characteristics: its identity and the values of at least one timer (for instance T4001 and T4003), when there is only one UMAN routing area code (RAI), and also the list of UMAN RAI that it can serve, when there is more than one UMAN routing area code per LAI.

When the logical unit UNC-CS LUi does not receive any message on a TCP connection from an active service station SSj for a determined period, it preferably monitors the availability of the TCP connection with this active service stations SSj by sending periodically a KEEP-ALIVE message (Keep Alive mechanism). If one of the TCP connections fails, the logical unit UNC-CS LUi is responsible to re-establish it.

When one service station SSj becomes active or inactive, the pilot station PSN of its physical UNC-PS D1 can send a CONFIG_INFO_UPDATE message to each logical unit UNC-CS LUi to which it is connected to through TCP path (s). This message contains the characteristics associated to each of its active service station SSj (same characteristics as in a CONFIG_INFO_RESULT message).

When there is more than one UMAN RAI per LAI, the service station SSj can send a SYSTEM_INFO_UPDATE message which contains the same information as a SYSTEM_INFO_RESULT message, to all established TCP connections (eventually to several logical unit UNC-CS LUi or to several physical UNC-CS D2) when the list of operational UMAN RAI that can be served by one of its TCP connections is modified, or periodically in order to send load indicators associated to the TCP connections. In that case, the list of operational UMAN RAI parameters is preferably not provided.

This load indicator has a range from 0 to 100 percents. It typically represents the CPU usage in percentage of the service station SSj. But it can also take into account several other criteria like the load state of the TCP connection and/or the number of active contexts in the service station SSj.

These load indicators are used by the logical unit UNC-CS LUi when it receives an URR-REGISTER-REQUEST message from a mobile station MS, in order to choose the TCP connection that will handle all the URR and URLC messages received from this mobile station MS.

When an URR-REGISTER-REQUEST message is received from a mobile station MS, a NSE+BVCI is allocated to the Cell Identifier (LAI+RAC+Cell Id) by the service station SSj, if not already done before.

The load indicators in the physical UNC-PS D1 are preferably computed to avoid too frequent changes.

It is important to recall that two constraints must be taken into account: a cell identity (Cell-ID) and a UMAN RAI are served by one SGSN in the GPRS network, and a load must be shared correctly between the processing boards of the service stations of a physical UNC-PS D1. So, it is necessary to handle the service station SSj, the routing areas and the cell. This handling can be performed as described hereafter.

In case where the service stations SSj are connected to one SGSN, each service station SSj supports all UMAN RAI. Therefore, when a mobile station MS wants to be registered, it sends an URR-REGISTER-REQUEST message to a logical unit UNC-CS LUi which can select any TCP connection to send an UPPS-REGISTER-REQUEST message, using a random rule or a circular rule, for instance.

When a service station SSj must send a first message related to a mobile station MS, to a SGSN, it selects a configured network service entity NSEk.

In case where the service stations SSj are connected to several SGSN, more than one UMAN RAI can be managed by a logical unit UNC-CS LUi. So, when an URR-REGISTER-REQUEST message is received by a logical unit UNC-CS LUi from a mobile station MS, it selects a UMAN RAI by means of rules such as the one described hereafter.

When the operator wants to manage the topology of the RAI in the UMA network, he can optionally associate a UMAN RAC to a list of access points in the UMA database. The UMAN location identities (UMAN CGI (UMAN LAI+UMAN Cell-Id) and the UMAN RAI (UMAN LAI+UMAN RAC)) are selected by the logical unit UNC-CS LUi if it receives them from the UMA database.

When the UMAN location identities (UMAN CGI (UMAN LAI+UMAN Cell-Id) and the UMAN RAI (UMAN LAI+UMAN RAC)) are not received from the UMA database and when a configuration data is set, the location identities are the GSM location identities received from the mobile station MS.

Otherwise (location identities not received from the UMA database or location identities not received from the mobile station MS in case of GPRS network not reachable by the mobile station MS and the configuration data is not set), a default value of UMAN RAC is allocated by the logical unit UNC-CS LUi.

Moreover, in case where the service stations SSj are connected to several SGSN, the SYSTEM_INFO_RESULT and SYSTEM_INFO_UPDATE messages contain the list of UMAN RAI (LAI+RAC) that each service station SSj can support. The SYSTEM_INFO_UPDATE message is sent by the service station SSj periodically in order to send load indicators associated to it.

Therefore, when an URR-REGISTER-REQUEST message is received by a logical unit UNC-CS LUi, it can select the most suitable TCP connection among the ones associated to the UMAN RAI. Then, when the service station SSj must send a first message related to a mobile station MS, to a service GPRS serving node SGSNk, it selects a network service entity NSEk associated to the RAI (RAIk).

When an URR-REGISTER-UPDATE-UPLINK message is received by a logical unit UNC-CS LUi, a new UMAN RAI is obtained, using the same rules as those that are used when an URR-REGISTER-REQUEST message is received.

If the new UMAN RAI is not the same as the old one, the logical unit UNC-CS LUi sends an URR-REGISTER-UPDATE-DOWNLINK message to the mobile station MS. Within this message, the location area identification (LAI) parameter contains the new LAI and an UNC Control Channel Description parameter contains the new RAC.

Then, there are two cases either the new RAI is served or not by the same TCP connection.

If the new RAI is served by the same TCP connection, the UPPS-REGISTER-UPDATE-UPLINK message is sent to the same TCP connection.

Then, when the service station SSj must send the next message related to the mobile station MS (probably a Routing Area Update Request message), to a SGSN, it selects a NSE associated to the new RAI. It can be the same NSE than in case of intra SGSN routing area (RA) update.

Figure 4:
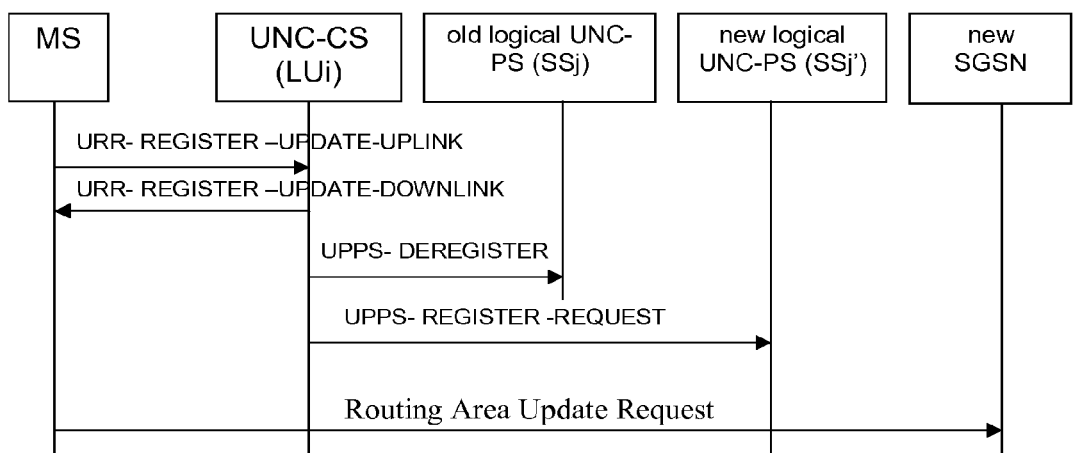

If the new RAI is not served by the same TCP connection, the logical unit UNC-CS LUi acts as illustrated in FIG. 4.

When the new service station SSj must send a first message related to the mobile station MS (probably a Routing Area Update Request message), to the new SGSN, it selects a NSE configured and associated to the new RAI.

The handling of the CGI can be implemented as described hereafter.

From a SGSN point of view and depending on the SGSN behaviour, either one cell identifier (LAI+RAC+Cell-ID) must be received from only one NSE (in other words, from the service station SSj point of view the same cell identifier must not be sent to two NSEs), or one cell identifier (LAI+RAC+Cell-ID) may be received from more than one NSE (in other words, from the service station SSj point of view the same cell identifier may be sent to two NSEs).

Two different SGSN behaviors can be envisaged.

In a first SGSN behavior (one CGI must be received from only one NSE), if the whole contents of CGI were managed by the operators in the UMA database, each message received from a mobile station MS by the UMA network and related to the same Cell ID would be processed by the same equipments (UNC-CS D2, UNC-PS D1 and SGSN). Such a constraint being very difficult to manage, it is possible to structure the CGI as follows. The static part of the CGI may be allocated by the operator in the UMA database (it can be associated to a set of access points in the UMA database), and the dynamic part of the CGI may be allocated by the logical unit UNC-CS LUi when it receives an URR-REGISTER-REQUEST message from the mobile station MS. For instance, 5 bits of the Cell ID may be reserved for the CGI dynamic part (depending on a configuration data in the logical unit UNC-CS LUi, either the most significant bit part of the Cell ID or the less significant bit part).

In a second SGSN behavior (one CGI may be received from more than one NSE), the whole contents of CGI can be managed by the operators in the UMA database. No dynamic part is allocated by the UMA network in the Cell ID.

To take into account these two SGSN behaviours, a configuration data can be created in the logical unit UNC-CS LUi. Depending on this configuration data the dynamic part of the Cell ID is either allocated or not.

Since in the standards the SGSN cannot send more than 6 Mbits/s per CGI, it is assumed that the static part of the CGI is correctly allocated by the operator. No control is made at the UNC-PS D1 level.

When an URR-REGISTER-REQUEST message is received by a logical unit UNC-CS LUi, it selects a TCP connection according to the criteria above mentioned, then depending on the configuration data, it either fills the dynamic part of the Cell ID using the identity of the service station SSj associated to the chosen TCP connection or not. The resulting CGI becomes the UMAN CGI. Then the logical unit UNC-CS LUi provides this UMAN CGI to the mobile station MS (within an URR-REGISTER-ACCEPT message) and to the UNC-PS (within an UPPS-REGISTER-REQUEST message). Finally the logical unit UNC-CS LUi provides the UMAN RAC to the mobile station MS (within an URR-REGISTER-ACCEPT message).

Then, when a service station SSj receives an UPPS-REGISTER-REQUEST message from the logical unit UNC-CS LUi, it associates a NSE+BVCI (Network Service Entity+BSS Virtual Connection Identifier) to the UMAN CGI (if the association UMAN CGI<=>NSEI+BVCI did not exist previously) in order to prepare an exchange of messages at the Gb interface (i.e into an NSE) and it sends this UMAN CGI to the SGSN.

The handling of the URLC messages can be implemented as described hereafter.

When a logical unit UNC-CS LUi receives an URLC message from a mobile station MS, it forwards it to the concerned service station SSj, via the selected TCP connection, within an UPPS message. The UMAN RAC and the UMAN CGI are preferably sent to a service station SSj in all UPPS messages.

When the service station SSj receives an URLC message within a TCP connection, it creates a context associated to the mobile station MS (if it has not already been created previously). All UPPS-DATA messages received by a service station SSj are forwarded to a SGSN using a NSE associated to its RAI.

The operator provisions each logical unit UNC-CS LUi in order it manages:
  the flag Enable_GPRS which indicates whether GPRS services for UMA shall be offered or not,
  a configuration data that contains its identity (sent in a SYSTEM-INFO-REQUEST message),
  a configuration data that contains one IP address of the active pilot station PSN of the physical UNC-PS D1. This data (or value) must be provisioned in the logical unit UNC-CS LUi when it must be connected with at least one service station SSj, via a TCP connection. There is only one value because a physical UNC-CS D2 is connected to only one physical UNC-PS D1,
  a configuration data that contains the default UMAN RAC,
  a configuration data that indicates if the dynamic part of the Cell ID is allocated or not,
  if the dynamic part of the Cell ID is allocated, a configuration data that indicates if the most significant part or the less significant part of the Cell ID is used for the dynamic part.

Moreover, the operator provisions each physical UNC-PS D1 in order it manages:
  two configuration data that contain timer information (for instance relative to T4001 timer and T4003 timer—their default values may be respectively 10 minutes and 30 seconds or 5 to 10 seconds),
  the NSE and NSVC,
  the characteristics related to each service station SSj:
  the identity of each service station SSj,
  the IP address and the TCP port used for TCP connection with the service station SSj,
  the list of NSE associated to each RAI (i.e. the list of NSE that can be selected by service station SSj for a mobile station MS located in this RAI).

It is recalled that the association between a Cell ID and NSEi+BVCI is not managed by the operator but is created dynamically by the UNC-PS D1.

More, the operator provisions the UMA database by associating a UMAN RAC to a set of access points. It is assumed that the UMAN CGI, including the UMAN LAI, is already associated to a set of access points in the UMA database.

To sum up, five types of messages are exchanged on the interface between a physical UNC-CS D2 and a physical UNC-PS D1:
  messages between a physical UNC-CS D2 and the pilot station PSN of a physical UNC-PS D1 for TCP path setting,
  messages between a physical UNC-CS D2 and a physical UNC-PS D1 for TCP path setting,
  messages between a physical UNC-CS D2 and a physical UNC-PS D1 for monitoring of all TCP paths,
  messages corresponding to URR messages,
  messages corresponding to URLC messages over TCP connection.

It is recalled that the URLC messages over UDP (such as URLC UNITDATA, URLC-UFC-REQ and URLC-DFC-REQ) are exchanged between the mobile station MS and the physical UNC-PS D1 without crossing the physical UNC-CS D2. Therefore, there is no corresponding message between a physical UNC-CS D2 and a physical UNC-PS D1.

Preferably, all messages between a physical UNC-CS D2 and a physical UNC-PS D1, corresponding to URR or URLC messages, contain a header (for instance encoded in "V" (fixed) format), few specific mandatory information elements with fixed length (for instance also encoded in V format), and other specific information elements (for instance encoded in TLV format).

The URR messages may comprise a header comprising, for instance, 4 octets defined exactly like the header of a corresponding URR message (Length indicator, UMA RR Protocol Discriminator, Skip indicator and URR message type), one octet for protocol version (only 3 lower weight bits for protocol version and 5 other bits are reserved), and 9 octets containing the IMSI (International Mobile Subscriber Identity) preferably encoded in V format.

When a logical unit UNC-CS LUi receives an URR-REGISTER-REQUEST messages from a mobile station MS, and if this logical unit UNC-CS LUi accepts this message, it sends an UPPS-REGISTER-REQUEST to a physical UNC-PS D1.

This message is not sent to the physical UNC-PS D1 when the logical unit UNC-CS LUi answers to the mobile station MS either with URR REGISTER-REJECT or URR-REGISTER-REDIRECT.

The UMAN Cell Identity, UMAN Location Area Identification and UMAN Routing Area Code must be stored in the UNC-CS context attached to the mobile station MS, in order to be sent to the physical UNC-PS D1 in all the URLC messages (UMAN Cell Identity, UMAN Location Area Identification and UMAN Routing Area Code are mandatory in all URLC messages sent to the physical UNC-PS D1, because it needs these information for BSSGP messages).

If the GPRS flag is disabled in the logical unit UNC-CS LUi, it does not send GPRS timers in the URR-REGISTER-ACCEPT message.

If the GPRS flag is enabled in the logical unit UNC-CS LUi, it shall store the latest set of GPRS timers received from the physical UNC-PS D1 and send them in the URR-REGISTER-ACCEPT all the time (i.e. even during temporary loss of the TCP connexion with the physical UNC-PS D1).

An UPPS-REGISTER-REQUEST message is also sent to a new service station SSj when an URR-REGISTER-UPDATE-UPLINK message is accepted at the logical unit UNC-CS LUi level and if the new RAI (if any) is not served by the same TCP connection as the old RAI.

When an URR-REGISTER-REQUEST message is received from a mobile station MS, a NSE+BVCI is allocated to the Cell Identifier (LAI+RAC+Cell Id) by the physical UNC-PS D1, if not already done before.

When an URR-REGISTER-UPDATE-UPLINK message is received with a new RAI by a logical unit UNC-CS LUi, it sends an UPPS-REGISTER-UPDATE-UPLINK message to the TCP connection used to send the URR-REGISTER-UPDATE-UPLINK message.

An URR-REGISTER-UPDATE-UPLINK message is sent by a logical unit UNC-CS LUi to a service station SSj when it receives and accepts an URR-REGISTER-UPDATE-UPLINK message from a mobile station MS, and if the new RAI (if any) is served by the same TCP connection as the old RAI.

This message is not sent to the service station SSj when the new RAI (if any) is not served by the same TCP connection as the old RAI (in this case, the logical unit UNC-CS LUi selects a new TCP connection), or when the logical unit UNC-CS LUi answers to the mobile station MS either with an URR DEREGISTER message or an URR-REGISTER-REDIRECT message. In these cases, the logical unit UNC-CS LUi sends an UPPS-DEREGISTER message to the service station SSj in order to release the mobile station context in it.

All information elements defined in the UPPS-REGISTER-UPDATE-UPLINK message and received in the URR-REGISTER-UPDATE-UPLINK message are forwarded unmodified. Besides, the "UMAN Cell identity", "UMAN Location Area Identification" and "UMAN Routing Area Code" information elements are also provided to the physical UNC-PS D1.

When the physical UNC-PS D1 receives an UPPS-REGISTER-UPDATE-UPLINK message, it always accepts it (no message is returned to the logical unit UNC-CS LUi). Then, if an UNC-PS context attached to the mobile station MS already exists, the MS context is updated with the received information. If there is no UNC-PS context attached to the mobile station MS, the UPPS-REGISTER-UPDATE-UPLINK message is ignored.

When a mobile station MS wants to be de-registered, it sends an URR-DEREGISTER message to the logical unit UNC-CS LUi. Upon receipt of this message, the logical unit UNC-CS LUi sends an UPPS-DEREGISTER message to the concerned physical UNC-PS D1. A mobile station de-registration may be also initiated by the logical unit UNC-CS LUi for instance when the TCP connection with the mobile station MS is released, or when it does not accept an URR-REGISTER-UPDATE-UPLINK, or when it has accepted an URR-REGISTER-UPDATE-UPLINK but the new RAI (if any) is not served by the same TCP connection as the old RAI.

All information elements defined in the UPPS-DEREGISTER message and received in the URR-DEREGISTER message are forwarded unmodified in the UPPS-DEREGISTER message.

When a mobile station MS wants to get synchronization information, it sends an URR-SYNCHRONIZATION-INFORMATION message to the logical unit UNC-CS LUi. Upon receipt of this message, the logical unit UNC-CS LUi sends an UPPS-SYNCHRONIZATION-INFORMATION message to the concerned physical UNC-PS D1. When the physical UNC-PS D1 receives this message, either an UNC-PS context attached to the mobile station MS already exists and the mobile station context is updated with the received information (mainly, if a transport channel exists for the mobile station MS, it is updated with the new IP address of this mobile station MS in order to send the URLC-UNIT-DATA to the correct IP address), or no UNC-PS context attached to the mobile station MS already exists (for example, the mobile station MS is deregistered) and the UPPS-SYNCHRONIZATION-INFORMATION message is ignored.

When a service station SSj receives a BSSGP (Paging-CS-PDU) from the Gb interface, two situations may occur. If there is a context associated to the mobile station MS, the service station SSj sends an UPPS-PAGING-REQUEST-CS message to the concerned UNC-CS D2. If there is no context associated to the mobile station MS, the service station SSj broadcasts this message to all the logical unit UNC-CS LUi having a TCP connection with its physical UNC-PS D1.

Therefore, the UPPS-PAGING-REQUEST-CS message is duplicated several times to the physical UNC-CS D2 (as many times as the number of service station SSj seen by one UNC-CS D2 (an UNC-CS D2 receiving a paging message not related to the mobile station MS it serves discards it)). Since the UNC-PS D1 does not offer a mechanism to avoid that, it must filter the repeated CS or PS paging message.

When the UNC-CS D2 receives this UPPS-PAGING-REQUEST-CS message, two situations may occur. If there is a context associated to the mobile station MS, it sends an URR-PAGING-REQUEST message to the mobile station MS. If there is no context associated to the mobile station MS, it drops the UPPS-Paging-Request-CS message.

It is important to notice that when an UNC-CS D2 receives an URR-PAGING-RESPONSE from a mobile station MS it does not forward it to the concerned UNC-PS D1.

There are two types of message that are exchanged between UNC-CS D2 and UNC-PS D1 and that correspond to all URLC messages over TCP exchanged between a mobile station MS and a UNC-CS D2: messages from UNC-CS D2 to UNC-PS D1 and messages from UNC-PS D1 to UNC-CS D2.

These messages contain a header followed by specific information elements.

The header may have the same structure as the one used for URR messages. So, it may contain 4 octets defined exactly like the first 4 octets of the header of the corresponding URLC message over TCP (Length indicator, URLC Protocol Discriminator, Skip indicator and URLC message type (which has only one value 0)), one octet for protocol version (only 3 lower weight bits for protocol version and 5 other bits are reserved), and 9 octets containing the IMSI preferably encoded in V format (in the downlink direction (UNC-PS→UNC-CS) this parameter is provided only if it is available).

For messages from UNC-CS D2 to UNC-PS D1 only, the header is preferably always followed by five fields encoded in V format (for instance) and one field encoded in TLV format (for instance).

The five fields encoded in V format (for instance) may be a field reserved for further use (for instance 2 octets), the UMAN Cell Identity (for instance 2 octets), the UMAN Location Area Identification (for instance 5 octets), the UMAN Routing Area Code (for instance 1 octet) and the IP address of the mobile station MS (for instance 18 octets).

The field encoded in TLV format (for instance) has the same structure for all messages between UNC-CS and UNC-PS (in both directions (uplink and downlink)) corresponding to URLC messages over TCP. For instance, it comprises a first octet representing the type of IEI (always equal to 0 to mean "encapsulation or URLC message") and following octets representing the whole content of the URLC message. The two first octets of the whole content of URLC message are used for the "length indicator" which specifies the total length of the message excluding these two octets for "Length indicator"). Thus, these octets represent also the length of the value of the parameter "encapsulation or URLC message".

It is important to notice that within messages from UNC-CS D2 to UNC-PS D1 and from UNC-PS D1 to UNC-CS D2, IMSI must be always provided.

The general handling of messages corresponding to the URLC messages over TCP will now be detailed.

In uplink direction, when the logical unit UNC-CS LUi receives an URLC message over TCP (identified by "URLC Protocol Discriminator"=2) from a mobile station MS, it always sends the corresponding message to the concerned physical UNC-PS D1. This message is encoded with firstly the IMSI, secondly the UMAN Cell Identity, UMAN Location Area Identification, UMAN Routing Area Code and IP address of the mobile station MS for GPRS user data transport (filled using information already stored in the mobile station context), and the entire URLC message received from the mobile station MS (without any modification) which is put in the "Encapsulation of URLC message" parameter. The logical unit UNC-CS LUi sends this message to the concerned UNC-PS D1.

When the concerned UNC-PS D1 receives an "URLC" message from a logical unit UNC-CS LUi (identified by "URLC Protocol Discriminator"=2), an UNC-PS context attached to the mobile station MS is either created or updated with location information. Then it stores in the mobile station context several information contained into the received message: the IMSI, the UMAN Cell Identity, the Routing Area Identity (which is the concatenation of the UMAN Location Area Identification and the UMAN Routing Area Code) and the TLLI (when it is received within the encapsulated URLC message).

Besides, the UNC-PS D1 preferably associates a BVCI to the UMAN Cell Identity out of the mobile station context in order to prepare exchange of messages at the Gb interface (if not already done previously).

Finally, the URLC message received in "Encapsulation of URLC message" parameter is processed by the UNC-PS D1 according to the UMA standard.

In downlink direction, when a BSSGP UnitData message is received by an UNC-PS D1 from a SGSN, it is dropped by this UNC-PS D1 if there is no context associated to the concerned mobile station MS.

When a paging message is received by an UNC-PS D2 from a SGSN, this UNC-PS D1 may broadcast it to all the UNC-CS D1 having a TCP connection with it, if there is no context associated to the concerned mobile station MS.

Therefore, the paging message may be duplicated several times into an UNC-CS D2 (as many times as the number of service station SSj seen by the UNC-CS D2 (when the UNC-CS D2 receives a paging message which is not related to the mobile station MS it serves, it discards it)). Since the UNC-PS D1 does not offer a mechanism to avoid that, the UNC-CS D2 must filter the repeated CS or PS paging message.

When, according to the UMA standard, an URLC message must be sent to a mobile station MS, the UNC-PS D1 creates the corresponding message to be sent to the concerned UNC-CS D2 as described hereafter. The IMSI is always provided and the entire URLC message to be sent to the mobile station MS is put in the "Encapsulation of URLC message" parameter of the message sent to the concerned UNC-CS D2.

When an UNC-CS D2 receives an UPPS message ("URLC messages over TCP" identified by "URLC Protocol Discriminator"=2) from an UNC-PS D1, it uses the IMSI received from this UNC-PS D1 to find its mobile station context.

If there is no context, the UPPS message is dropped (paging message included). If there is a context, the UNC-CS D2 sends the corresponding URLC message to the mobile station MS stored in this context. This URLC message is encoded using "Encapsulation of URLC message" parameter content, without any modification.

The three parts (physical UNC-PS D1, physical UNC-CS D2 and SGW) defining the UMA network controller (UNC) according to the invention, may be realized with software modules, or hardware modules, or else a combination of hardware and software modules.

The invention is not limited to the embodiments of UMA network controller described above, only as examples, but it encompasses all alternative embodiments which may be considered by one skilled in the art within the scope of the claims hereafter.

In the preceding description it has been described a non limiting example of implementation of the invention in which the transport (or transmission) protocol used between UNC-PC and UNC-PS parts of one or more UMA network controller(s) is TCP. But, the invention is not limited to this type of transport (or transmission) protocol. It applies to other types of transport (or transmission) protocol, and notably to UDP.

The invention claimed is:

1. An Unlicensed Mobile Access (UMA) network controller for an UMA mobile communication network comprising:
   a circuit switched core network with at least one mobile switching center and a media gateway; and
   a packet switched core network with at least one serving GPRS serving node, including a security gateway, a packet switched part and a circuit switched part, the security gateway coupled to the media gateway, to at least one packet switched part and to at least one circuit switched part, and arranged
      to ensure security procedures between mobile stations and an UMA world,
      to forward messages relative to a control plan for both the circuit switched core network and the packet switched core network between mobile stations and at least one circuit switched part,
      to forward messages relative to a user plan for the circuit switched core network between mobile stations and the media gateway, and
      to forward messages relative to a user plan for the packet switched core network between mobile stations and at least one packet switched part, the at least one packet switched part intercalated between the serving GPRS serving node and the security gateway, and arranged to forward user data between the serving GPRS serving node and mobile stations through the security gateway, and to handle the control plan for the packet switched core network through packet switched call messages over TCP, and the at least one circuit switched part being intercalated between the security gateway and a mobile switching center, and arranged to handle the control plan for the circuit switched core network and discovery and registration procedures of the mobile stations, to forward packet switched call messages over TCP between the at least one packet switched part and the mobile stations through the security gateway, and to relay circuit switched call messages between the mobile switching center and the mobile stations through the security gateway.

2. The UMA network controller of claim 1, wherein the at least one packet switched part and the at least one circuit switched part are arranged to exchange messages through at least one transport path.

3. The UMA network controller of claim 2, wherein the at least one transport path is chosen from a group including at least a TCP path and an UDP path.

4. The UMA network controller of claim 1, wherein the packet switched part includes a pilot station configured to implement an operating and maintenance function and chosen centralized functions, and at least one logical service station configured to handle the control plan and the user plan of the GPRS traffic.

5. The UMA network controller of claim 4, wherein the at least one circuit switched part includes at least one logical unit UNC-CS configured to establish a transport connection with at least one logical service station of the at least one packet switched part to handle the control plan for the circuit switched core network and discovery and registration procedures of the mobile stations to forward packet switched call messages over TCP between each of the at least one logical service stations and the mobile stations through the security gateway, and to relay circuit switched call messages between the mobile switching center and the mobile stations through the security gateway.

6. The UMA network controller of claim 5, wherein each of the at least one logical service stations is a functional entity supporting one transport connection per logical unit, and one network service entity per serving GPRS serving node.

7. The UMA network controller of claim 6, wherein each logical unit is configured to select a transport path among a plurality of transport paths that serves a chosen routing area identity associated with a serving GPRS serving node, and the logical service station which is connected to the chosen transport path is configured to select a network service entity from among the network service entities that can be selected for the chosen routing area identity.

8. The UMA network controller of claim 5, wherein each logical unit is configured, when each logical unit establishes a transport connection,
   to request from the pilot station of the at least one packet switched part, the identity of each of the active logical service stations (SSj) of the pilot station and an IP address and a transport port to use to establish a transport path with each of the active service stations,
   to establish effective transport connections with the active logical service station, using the received IP addresses and transport ports, and
   to send the identity of the logical unit, via the established transport connections, to the active logical service stations to trigger the active logical service stations to send the logical unit the respective identities of the active logical service stations and eventual lists of routing area identities that the active logical service stations can respectively serve.

9. The UMA network controller of claim 8, wherein each active logical service station is arranged to accept the transport connection even if all the network service entities of the active logical service station are not operational.

10. The UMA network controller of claim 8, wherein each logical unit configured to periodically attempt to establish the transport connection when the transport connection fails.

11. The UMA network controller of claim 8, wherein each logical unit is configured to monitor the availability of transport connections by sending periodically a dedicated message to the pilot station and the logical service stations of the concerned packet switched part.

12. The UMA network controller of claim 5, wherein each logical unit is configured, upon receipt of a message of an URR type from a mobile station, to choose a transport connection to handle messages of the URR and URLC types received from the mobile station, and to forward the received URR message to the logical service station connected to the chosen transport connection, within a message of an UPPS type.

13. The UMA network controller of claim 12, wherein each logical service station is configured, upon receipt of an UPPS message containing an URR message from a mobile station, to allocate a NSEi+BVCi to a Cell Identifier contained in the received UPPS message.

14. The UMA network controller of claim 12, wherein each logical unit is configured, upon receipt of a message of an URR type from a mobile station and if the logical unit manages more than one routing area identity, either to select one of the more than one routing area identities using at least one chosen rule, or to select the routing area identity transmitted by the mobile station, and to select the logical service station corresponding to the selected routing area identity.

15. The UMA network controller of claim 14, wherein each logical unit is configured, upon receipt of a message of an URLC type from a mobile station, to forward the received URLC message to the concerned logical service station, via a selected transport connection, within a message of an UPPS type, and the logical service station is configured, when required and upon receipt of the UPPS message comprising the URLC message, to create a context associated to the mobile station and to forward the data contained in the URLC message to a serving GPRS serving node through a network service entity associated with the routing area identity associated with the serving GPRS serving node.

16. The UMA network controller of claim 1, wherein the circuit switched part is installed into a circuit switched call server-which also includes the mobile switching center.

* * * * *